United States Patent
Andrea Tallada et al.

(10) Patent No.: US 9,815,308 B2
(45) Date of Patent: Nov. 14, 2017

(54) PRINTER CALIBRATION FOR MEDIA COLOR

(71) Applicant: HEWLETT-PACKARD DEVELOPMENT COMPANY, L.P., Houston, TX (US)

(72) Inventors: Alex Andrea Tallada, Barcelona (ES); Luis Garcia Garcia, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 15/103,577

(22) PCT Filed: Dec. 18, 2013

(86) PCT No.: PCT/US2013/075923
§ 371 (c)(1),
(2) Date: Jun. 10, 2016

(87) PCT Pub. No.: WO2015/094206
PCT Pub. Date: Jun. 25, 2015

(65) Prior Publication Data
US 2016/0303878 A1   Oct. 20, 2016

(51) Int. Cl.
*B41J 29/393*   (2006.01)
*H04N 1/60*   (2006.01)
*B41J 2/21*   (2006.01)

(52) U.S. Cl.
CPC ........... *B41J 29/393* (2013.01); *B41J 2/21* (2013.01); *B41J 2/2117* (2013.01); *H04N 1/6097* (2013.01); *B41J 2/2114* (2013.01)

(58) Field of Classification Search
CPC ...... B41J 29/393; B41J 2/2114; B41J 2/2117; B41J 2/21; H04N 1/6097
See application file for complete search history.

(56) References Cited

U.S. PATENT DOCUMENTS

| 6,552,820 B1 | 4/2003 | Hill |
| 2002/0181018 A1* | 12/2002 | Hung ............... H04N 1/6033 358/1.15 |

(Continued)

FOREIGN PATENT DOCUMENTS

| CN | 101631191 | 1/2010 |
| CN | 102883889 | 1/2013 |

(Continued)

OTHER PUBLICATIONS

Achieving Color Balance on Press #1, (Web Page), Retrieved Nov. 12, 2013, 4 Pages, http://www.convertingresource.com/news/news_article_new.html?id=1340.

(Continued)

*Primary Examiner* — Sharon A Polk
(74) *Attorney, Agent, or Firm* — HP Inc.-Patent Department

(57) ABSTRACT

A printer is disclosed. The printer is calibrated for use with colored media. The printer is calibrated by converting an original color look up table (CLUT) for use on any colored media to a modified CLUT for use on colored media with a measured color. Each of a plurality of output colors in the original CLUT are modified using the measured color of the media.

12 Claims, 4 Drawing Sheets

(56) References Cited

U.S. PATENT DOCUMENTS

| | | |
|---|---|---|
| 2007/0206982 A1 | 9/2007 | Roth et al. |
| 2008/0055666 A1 | 3/2008 | Gila et al. |
| 2008/0106568 A1 | 5/2008 | Albrecht et al. |
| 2008/0252651 A1 | 10/2008 | Mills |
| 2010/0060682 A1 | 3/2010 | Akatsuka |
| 2010/0208312 A1 | 8/2010 | Hashizume et al. |
| 2011/0181637 A1 | 7/2011 | Doggett et al. |
| 2011/0242556 A1 | 10/2011 | Jinno et al. |
| 2012/0262529 A1 | 10/2012 | Roth et al. |
| 2013/0187972 A1 | 7/2013 | Viturro et al. |
| 2013/0321514 A1* | 12/2013 | Pous ............... B41J 29/393 347/19 |
| 2015/0202883 A1* | 7/2015 | Kojima ............ H04N 1/6097 347/14 |

FOREIGN PATENT DOCUMENTS

| | | |
|---|---|---|
| CN | 103380402 | 10/2013 |
| WO | WO-2013008245 | 1/2013 |

OTHER PUBLICATIONS

International Search Report. Date of mailing Sep. 18, 2014, Application No. PCT/US2013/075923, Filing date Dec. 18, 2013.

\* cited by examiner

PRINTER CALIBRATION FOR MEDIA COLOR

BACKGROUND

Printers that print on rigid media commonly use colored media. A colored media is any media that is non-white. Some of the colored media used are raw materials, for example: wood, aluminum cardboard and the like. Medias made from raw material have the color of the raw material, for example the brown color of cardboard. Some other types of rigid media, include: PVC foams, plastic films, corrugated plastics and the like. These medias typically have an added color, for example: black, red, yellow and the like. When printing a color image onto these non-white medias the printer typically prints an opaque white ink layer onto the media, then prints the image on top of the white layer. By printing the image on top of the opaque white layer, the final image maintains its correct colors.

DETAILED DESCRIPTION

Figure 1:
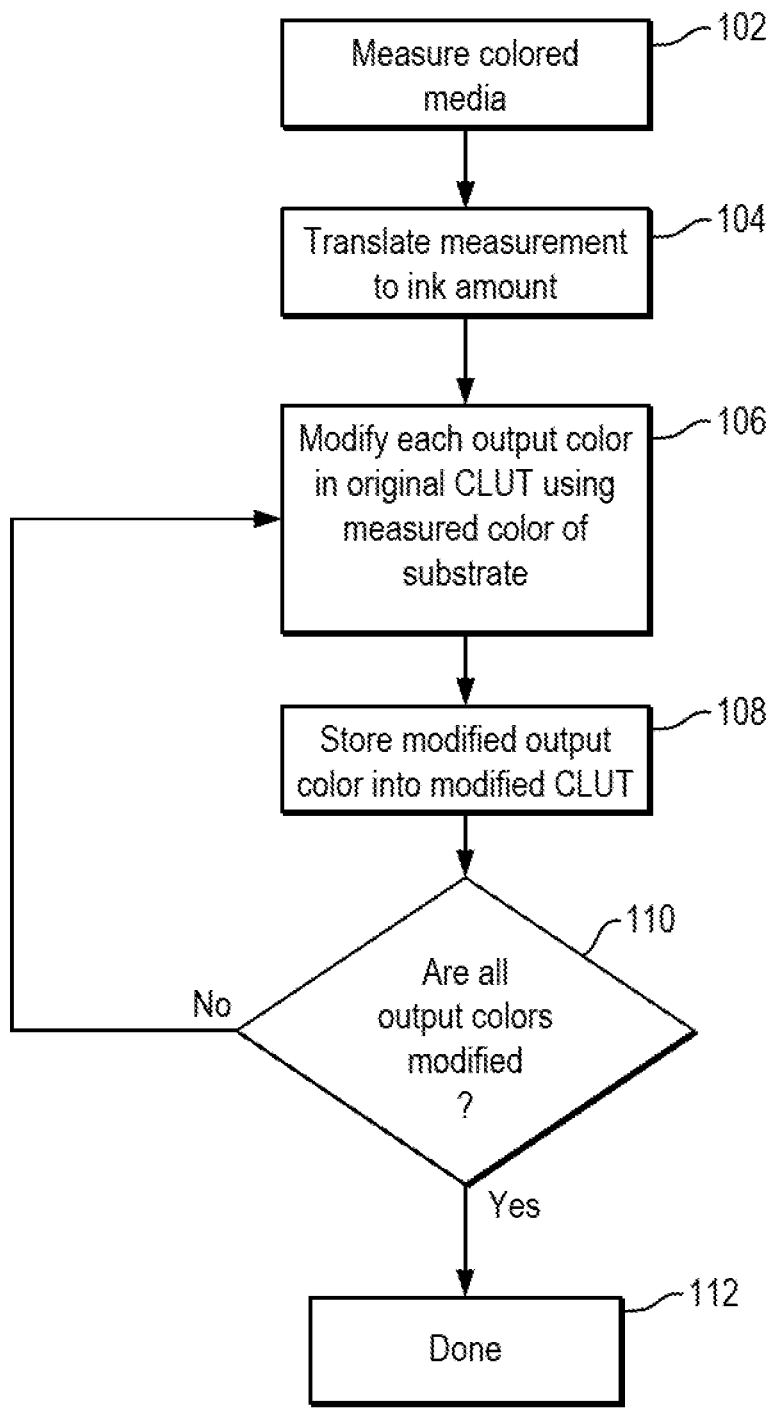
FIG. 1 is an example flow chart for calibrating a printer for a colored media.

Typical inkjet color inks are somewhat transparent. This allows them to mix together to obtain secondary colors when they are applied on top of each other. Most media is white. The semi-transparent nature of the inkjet inks lets the light penetrate to, and reflected off, the white media. This allows the ink to be able to render light colon. It also allows backlit applications where the light has to pass through the ink from the back side.

The semi-transparent nature of the inks makes it difficult to print directly on colored media (i.e. non-white media), since the color of the media would impact the final color observed. As an example, if a cyan patch is printed on white media a light Cyan patch is visible. If the same cyan patch is printed on red media, the final color would be blue. That s because the final color is a mix of the media color and the in color. If the ink was opaque, the light would not reach the media and the media color would not affect the color of the ink printed. Therefore both patches of cyan ink would appear as the same color.

Inkjet printers overcome this problem when printing on colored media by printing a layer of opaque white ink onto the colored media. The white ink is applied at any place where color inks are used or where the image content is white. The white ink is applied in a thick layer (twice the ink densities compared to color inks) to completely cover the media and avoid its color influence on the final image. The colored inks are printed on top of the white ink layer. Unfortunately, the opaque white ink is generally more expensive than standard process color inks. In addition the white ink may need to dry or be cured before the color inks are printed over the white layer. This increases the cost and slows the printing process down when printing on colored media.

In one example of the invention, the media color is used as part of the color management process. The media color is used as a color component to generate each target color present in the image. White ink and the media color are blended together to create a new process color. The new process color is used along with the cyan, magenta, yellow and black (CMYK) inks to form the final image. The white ink is put down as a first layer. The minimum amount of White ink is used to create a semi-opaque layer that lets a specific amount of the media color to remain visible. The specific amount of media color that remains visible may vary between zero (i.e. none of the media color remaining visible) and 100% (i.e. all of the media color remaining visible). After the white layer of ink has been deposited the CMYK color inks are deposited on top of the semi-opaque white layer to create the final output color.

For example, when printing a grey patch on black media, the minimal amount of white ink required to turn the black media to grey is used. The layer of opaque white ink will not completely cover/block the media color, but will only cover/block a percentage of the media color, dependent on what shade of grey is required. The partial white layer will blend with the black media color to produce the desired grey color. This saves white ink and black ink compared to other methods. White ink is saved because a fully opaque white layer to completely cover the media is not used The black media color is used instead of black ink to produce the desired grey color. Therefore no black ink is used.

In one example of the invention, the printer is calibrated for a given colored media. The printer is calibrated by converting a traditional or original Color Look Up Table ((MUD for use on any colored media to a modified CLUT for use on a specific colored media. A traditional or original CLUT for use on any colored media is a CLUT that has an opaque white ink set at 100% for every output color. Because a layer of opaque white ink is deposited under each color, the CLUT can be used on any color of media. The original CLUT is modified using the measured color of the media. No other color patches or measurements are required. The converted CLUT has the same format as the original CLUT. As a result, when the printer prints on the colored media, the converted CLUT can be substituted for the original CLUT in the current color processing pipeline.

A CLUT for a printer is a mapping of a plurality of input colors to an output color for each input color. The plurality of output colors are also known as color nodes. The output color is in a device space. The device space for a printer is typically the amount of ink used for each ink in an ink set. One example of a CLUT is contained in an International Color Consortium (ICC) profile. An ICC profile maps an input color to a device space. The input color is specified in International commission on illumination (CIE) Lab color space (also known as CIELAB). The device space for a printer is the amount of ink used for each ink in an ink set.

An ink set comprises the different ink colors used in a printer. Some printers only have three ink colors in their ink set, for example cyan, magenta and yellow (CMY). Many printers use black ink (K) as an additional ink color creating a 4 color ink set (CMYK). Traditionally, a printer printing on colored media includes an opaque white ink (W) in the ink set, for example CMYKW. Some printers have more than 4 colors in their ink set. The additional colors may be used to increase the color gamut of the printer, or may be used to balance the in use across the different ink colors. The additional colors may include a grey ink, a light shade of the cyan, yellow and magenta inks, a red, green or blue ink, and the like.

In one example, the CLUT for use on any colored media has 5 inks in the ink set. The 5 inks are typically cyan, magenta, yellow, black and an opaque white ink (CMYKW). The white ink value in the CLUT is set at the maximum amount 100% for every input color. The maximum amount for white ink is typically twice the density of the color inks. The ink value for all the other inks very dependent on the input color. The original CLUT will be modified to include a specific amount of the media color by reducing the amount of white ink used for each input color.

FIG. 1 is an example flow chart for calibrating a printer for a colored media. The calibration procedure may be used for both rigid and non-rigid colored media. Flow starts at 102 where the colored media is measured. The measurement may be done using an internal sensor, for example a scanner or spectrophotometer. Or the media may be measured using an external sensor. Typically the measurement will be done in the CIELAB color space, but other color spaces may be used.

Flow continues at step 104 where the measured color value of the media is translated into ink values using an original CLUT for colored medias for the printer. Typically the original CLUT for colored medias is shipped with the printer and is based on the specific opaque white ink used in the printer. If a CLUT for colored media is not shipped with the printer, one can be created by printing and measuring a white patch using the opaque white ink and inputting the information into a color profiling tool.

Flow then continues at step 106 where each output color (or color node) in the original CLUT is modified using the measured color of the media. Because the output colors in the original CLUT are in device space, the media color used to modify each output color is also in device space. At 108 the modified output color from the original CLUT is stored into a modified CLUT. Flow returns to 106 when there are still output colors to be modified. When all the output colors in the original CLUT are modified flow proceeds to 112 where the calibration is complete. The printer can now print on the media using the media color as part of the ink set.

At step 106 each output color in the original CLUT is modified. The modification proceeds in three steps. The first step is to determine the maximum amount of the media color that can be used to produce the output color. The maximum amount of the media color $SC_{max}$ that can be used to produce the current output color is equal to the smallest non-zero ratio between the ink amounts in the output_color[CMYK] and the ink amounts in the media_color[CMYK] for each ink color in the ink set, excluding white ink.

In one example a peen color will be printed on a red media. In this example the ink amounts will be in percentages with 100 representing the maximum amount of ink for that color of ink. The ink set will comprise CMYKW but the white ink in the original CLUT will always be set at 100. The white ink amount is not used to determine the maximum amount of the media color $SC_{max}$ so it will not be shown. The green color has the following ink amounts [80, 30, 80, 0] in the original CLUT. The red media has been measured and the corresponding output color of the media in the original CLUT has the following ink amounts [0, 100, 100, 0]. The maximum amount of the media color $SC_{max}$ that can be used to produce the current output color is calculated as the smallest ratio between the output_color (green) and the media_color(red) for each color of ink.

The output color (green) uses a cyan ink amount of 80. The media color (red) uses a cyan ink amount of 0. The ratio 80/0 is undefined. The ratios for the magenta, yellow and black inks are 30/100 80/100 and 0/0 respectively. The smallest non-zero ratio is 0.3 for the magenta ink so $SC_{max}$ is equal to 0.3.

The next step in modifying each output color in the original CLUT is to determine the modified amount of opaque white ink used. The modified amount of white ink used is equal to $1-SC_{max}$ times 100. So the modified amount of white ink used for the green color printed on the red media is $(1-0.3)*100=70$. The last step in modifying each output color in the original CLUT is to determine the modified amount of the CMYK inks. The modified ink amounts for each output color are equal to the original ink amount for the output color$-SC_{max}$ times the media ink amounts (see equation 1).

$$\text{Output\_color [CMYK]}' = \text{Output\_color[CMYK]} - SC_{max} * \text{Media\_color[CMYK]} \quad \text{Equation 1}$$

In the example of printing a green color on a red media the modified output colors would be as follows: for cyan the original ink amount is 80 so the modified ink amount is equal to $80-0.3*0=80$: for magenta the modified ink amount is equal to $30-0.3*100=0$; for yellow the modified ink amount is equal to $80-0.3*100=50$; for black the modified ink amount is equal to $0-0.3*0=0$. Table 1 summarizes the change in ink amounts used to print the green color on the red media between the conventional method of printing a layer of opaque white ink and the new method of using the media color as part of the ink set.

TABLE 1

|  | Old [CMYK] | New [CMYKW]' |
| --- | --- | --- |
| C | 80 | 80 |
| M | 30 | 0 |
| Y | 80 | 50 |
| K | 0 | 0 |
| W | 100 | 70 |
| Total (2x white layer) | 390% | 270% |

This shows that using the media color as part of the ink set reduces the amount of ink used by 31%.

Figure 2:
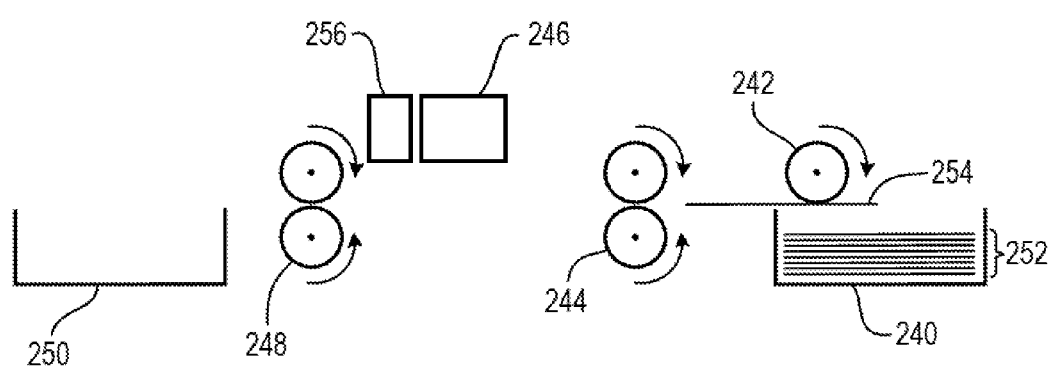
FIG. 2 is a schematic view of an example printer 200.

FIG. 2 is a schematic view of an example printer 200. Printer 200 comprises an input tray 240, a pick roller 242, a pair of pinch rollers 244, a printhead 246, a sensor 256, a pair of output rollers 248 and an output tray 250. Input tray 240 contains a stack of blank media 252. The blank pages are moved, one page at a time, from the input tray 240 along a paper path to the output tray 250. The paper path runs from the input tray 240, between the pair of pinch rollers 244, under the printhead 246 and the sensor 256, between the pair of output rollers 248 and into the output tray 250. The pick roller 242 moves the top sheet 254 from the stack of media 252 towards the pinch rollers 244. Page 254 is shown after it has been moved off the top of stack 252.

The stack of media in the input tray 240 may be flexible media, for example paper, or may be rigid media, for example cardboard. In some examples rigid media may use a different input tray or different feeding mechanism than flexible media. As the media passes under the printhead 246, printing fluid is deposited onto the media. Printing fluid is any type of fluid used in a printing process and can include ink, an under coat, a gloss, a metallic fill and the like. The printhead 246 may be a scanning type of printhead that travels back and forth across the media in a direction perpendicular to the paper advance direction as it deposits printing fluid on the media. Or the printhead 246 may be a page wide array (PWA) that deposits printing fluid across the full width of the media as the media passes underneath the printhead 246.

After the media passes under the printhead 246 it passes under sensor 256. Sensor 256 may be a scanner or a spectrophotometer. Sensor 256 is used to measure the color of media in the paper path. The sensor 256 may be a scanning type of sensor that travels back and forth across the media in a direction perpendicular to the paper advance direction as it scans the media. Or the sensor 256 may be a page wide array (PWA) sensor that scans the width of the media as it travels underneath the sensor 256. Sensor 256 may produce measurements in red, green and blue (RGB) color space or in CIELAB color space. When sensor 256 produce measurements in RGB color space, the measurements may be translated into CIELAB color space. The measured color of the media will be used to modify a CLUT for use on any colored media into a CLUT for use on the measured media.

The printer described above is a sheet feed printer. In other examples the printer may be a roll to roll printer, a rigid flatbed single feed bottom pick printer, a roll to free floor printer or the like. In addition a stacker or other type of finishing device may be used with the painter.

Figure 3:
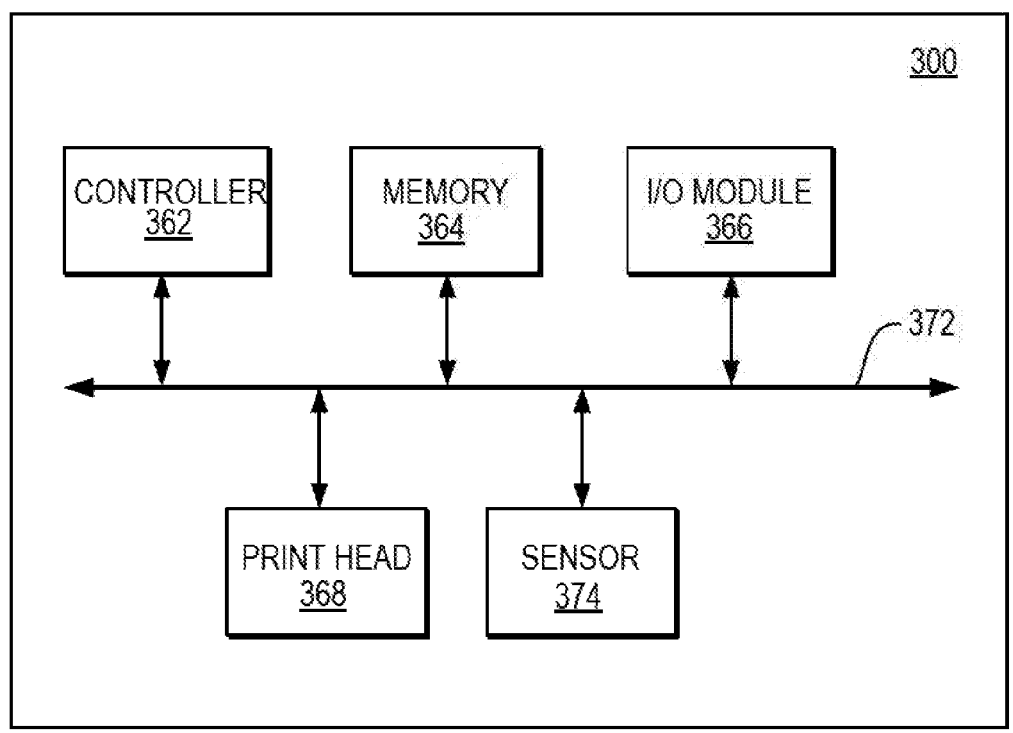
FIG. 3 is an electrical block diagram of an example printer 300.

FIG. 3 is an electrical block diagram of an example printer 300. Printer comprises a controller 362, memory 364, input/output (I/O) module 366, printhead 368 and a sensor 374 all coupled together on bus 372. In some examples printer may also have a user interface module, an input device, and the like, but these items are not shown for clarity. Controller 362 comprises at least one processor. The processor may comprise a central processing unit (CPU), a micro-processor, an application specific integrated circuit (ASIC), or a combination of these devices. Memory 364 may comprise volatile memory, non-volatile memory, and a storage device. Memory 364 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 366 is used to couple printer to other devices, for example the Internet or a computer. Printer has computer executable code, typically called firmware, stored in the memory 364. The firmware is stored as computer readable instructions in the non-transitory computer readable medium (i.e. the memory 364). The processor generally retrieves and executes the instructions stored in the non-transitory computer-readable medium to operate the printer and to execute functions. In one example, processor executes code that calibrates the printer for colored media.

Figure 4:
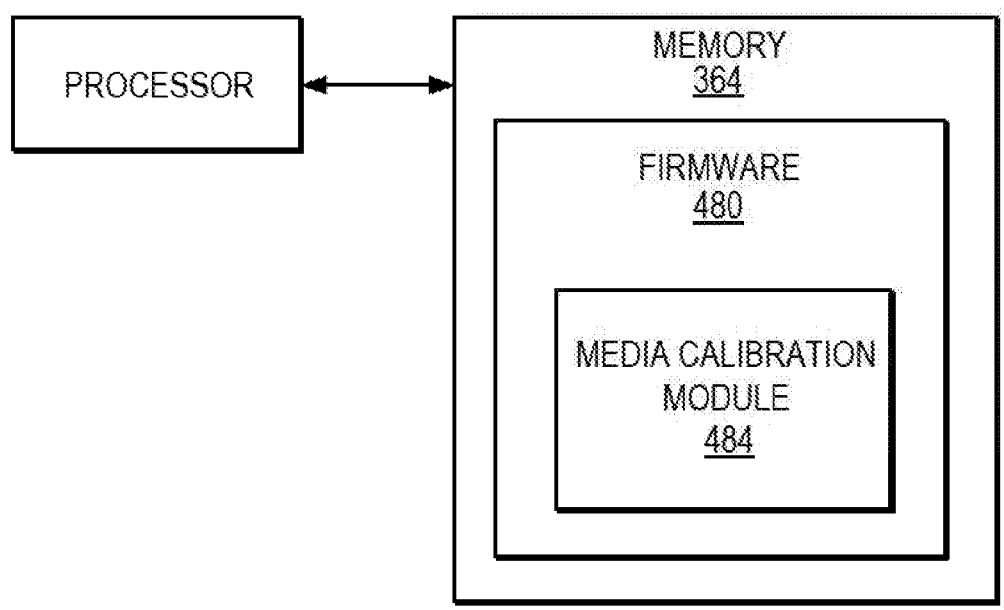
FIG. 4 is an example block diagram of the processor coupled to memory 364.

FIG. 4 is an example block diagram of the processor coupled to memory 364. Memory 364 contains firmware 480. Firmware 480 contains a media calibration module 484. The processor executes the code in the media calibration module 484 to calibrate the printer for colored media. The media calibration module may use the method shown in FIG. 1 to calibrate the printer for colored media.

What is claimed is:

1. A printer, comprising:
   a printhead to deposit printing fluids onto media;
   a controller to control the printhead, the controller having a processor; and
   a memory coupled to the controller, the memory having a media calibration module loaded therein;
   the media calibration module, when executed by the processor, to cause the printer to modify an original color look up table (CLUT) stored in the memory, into a modified CLUT for use on a colored media, wherein the original CLUT is modified using a measured color of the media and wherein the original CLUT is for use on any colored media,
   wherein to modify the original CLUT, the media calibration module is to cause the printer to:
   for each output color in the original CLUT:
     determine a maximum media color $SC_{max}$ based on the measured non-white color of the media and the output color;
     determine a modified ink amount for each non-white ink based on the maximum media color $SC_{max}$, and
     determine a white ink amount based on the maximum media color $SC_{max}$.

2. The printer of claim 1, further comprising:
   a spectrophotometer to measure the color of media loaded into the printer.

3. The printer of claim 1, further comprising:
   an ink set, the ink set comprising a plurality of color inks and an opaque white ink; and
   the modified CLUT having a plurality of output colors each having an ink level for the opaque white ink at less than 100%.

4. The printer of claim 3, wherein the plurality of color inks include cyan ink, magenta ink, yellow ink and black ink.

5. The printer of claim 1, wherein the media is rigid.

6. A method of calibrating a printer, comprising:
   converting an original color look up table (CLUT) for use on any colored media to a modified CLUT for use on a colored media, where the original CLUT has a plurality of output colors;
   modifying each of the plurality of output colors in the original CLUT using a measured color of the media, comprising:
     determining a maximum media color $SC_{max}$ based on the measured color of the media and the output color;
     determining a modified ink amount for each non-white ink based on the maximum media color $SC_{max}$; and
     determining a white ink amount based on the maximum media color $SC_{max}$;
   saving the modified output colors into the modified CLUT.

7. The method of claim 6, further comprising:
   printing on the media using the modified CLUT.

8. The method of claim 6, further comprising:
   measuring the color of the media using a spectrophotometer internal to the printer.

9. The method of claim 6, wherein the printer has an ink set, the ink set comprising a plurality of color inks and an opaque white ink; and
   wherein the modified CLUT having a plurality of output colors each having an ink level for the opaque white ink at less than 100%.

10. The method of claim 9, wherein the plurality of color inks includes cyan ink, magenta ink, yellow ink and black ink.

11. The method of claim 6, wherein the media is rigid.

12. A non-transitory computer readable medium containing computer instructions that, when executed by a processor, calibrate a printer, comprising:
    converting an original color look up table (CLUT) for use on any colored media to a modified CLUT for use on a colored media, where the original CLUT has a plurality of output colors; and modifying each of the plurality of output colors in the original CLUT using a measured color of the media, comprising:
determining a maximum media color $SC_{max}$ based on the measured color of the media and the output color;
determining a modified ink amount for each non-white ink based on the maximum media color $SC_{max}$; and
determining a white ink amount based on the maximum media color $SC_{max}$.

* * * * *